(12) United States Patent
Jung et al.

(10) Patent No.: US 11,871,152 B2
(45) Date of Patent: Jan. 9, 2024

(54) INFORMATION PROCESSING SYSTEM, INFORMATION PROCESSING APPARATUS, AND PROGRAM

(71) Applicant: oVice, Inc., Nanao (JP)

(72) Inventors: Sae Hyung Jung, Nanao (JP); Hirokazu Hasegawa, Kyoto (JP)

(73) Assignee: OVICE, INC., Nanao (JP)

( * ) Notice: Subject to any disclaimer, the term of this patent is extended or adjusted under 35 U.S.C. 154(b) by 2 days.

(21) Appl. No.: 17/761,081

(22) PCT Filed: Apr. 23, 2021

(86) PCT No.: PCT/JP2021/016457
§ 371 (c)(1),
(2) Date: Mar. 16, 2022

(87) PCT Pub. No.: WO2021/235172
PCT Pub. Date: Nov. 25, 2021

(65) Prior Publication Data
US 2022/0345666 A1 Oct. 27, 2022

(30) Foreign Application Priority Data

May 19, 2020 (JP) .................................. 2020-087176
Jun. 26, 2020 (JP) .................................. 2020-110871
(Continued)

(51) Int. Cl.
*H04N 7/15* (2006.01)
*G06T 7/70* (2017.01)
*H04L 12/18* (2006.01)

(52) U.S. Cl.
CPC .............. *H04N 7/157* (2013.01); *G06T 7/70* (2017.01); *H04L 12/1827* (2013.01); *H04L 12/1831* (2013.01); *H04N 7/152* (2013.01)

(58) Field of Classification Search
None
See application file for complete search history.

(56) References Cited

U.S. PATENT DOCUMENTS 6,559,863 B1 * 5/2003 Megiddo .................. H04N 7/15
348/E7.083
7,346,654 B1 * 3/2008 Weiss ....................... H04N 7/15
348/E7.083
(Continued)

FOREIGN PATENT DOCUMENTS

EP      2 953 098 B1    3/2019
JP      2014-204412 A   10/2014
(Continued)

OTHER PUBLICATIONS

International Search Report dated Jun. 1, 2021, issued in counterpart International Application No. PCT/JP2021/016457, with English Translation. (7 pages).
(Continued)

*Primary Examiner* — Stella L. Woo
(74) *Attorney, Agent, or Firm* — WHDA, LLP (57) ABSTRACT

A virtual space management unit 60 generates a virtual space information and manages the virtual space information. An icon position acquisition unit 61 acquires icon position information of each of the users U. A transmission-side voice acquisition unit 62 acquires a transmission-side voice information. A distance calculation unit 63 calculates a distance between each of the icons based on a position within the virtual space of the icons corresponding to each of the users U. A correction factor determination unit 64 determines a correction factor of an output information based on the distance between the icons calculated by the distance calculation unit 63. A reception-side voice transmission control unit 65 transmits the acquired transmission-
(Continued)

side voice information and the determined correction factor to each of the second user terminals 3.

11 Claims, 7 Drawing Sheets

(30) Foreign Application Priority Data

| Aug. 17, 2020 | (JP) | 2020-137271 |
|---|---|---|
| Oct. 13, 2020 | (JP) | 2020-172415 |
| Nov. 11, 2020 | (JP) | 2020-187756 |

(56) References Cited

U.S. PATENT DOCUMENTS

| 8,875,026 | B2* | 10/2014 | Hamilton, II | G06F 3/012 |
| | | | | 715/728 |
| 10,952,006 | B1* | 3/2021 | Krol | G06F 3/165 |
| 2008/0294721 | A1* | 11/2008 | Berndt | H04M 3/568 |
| | | | | 709/204 |
| 2015/0356787 | A1 | 12/2015 | Abe et al. | |
| 2017/0056768 | A1 | 3/2017 | Aizawa et al. | |
| 2017/0123752 | A1* | 5/2017 | Nadler | G06T 13/205 |
| 2017/0318262 | A1* | 11/2017 | Safaei | H04N 7/0127 |
| 2019/0173682 | A1* | 6/2019 | Kempf | H04N 7/152 |
| 2021/0084357 | A1* | 3/2021 | Tajik | H04N 7/157 |
| 2021/0352244 | A1* | 11/2021 | Benedetto | H04N 7/15 |

FOREIGN PATENT DOCUMENTS

| JP | 2015-164450 A | 9/2015 |
| JP | 2016-187063 A | 10/2016 |
| JP | 2019-117998 A | 7/2019 |
| JP | 2019-128683 A | 8/2019 |
| JP | 2019-176386 A | 10/2019 |
| JP | 2020-31303 A | 2/2020 |
| WO | 2014/119097 A1 | 8/2014 |

OTHER PUBLICATIONS

Kai., "It's completely different from the Zoom drinking party! "Spatial Chat" to introduce "distance" to online drinking parties", The voice of "people nearby" can be heard loudly! Communication that is clearly different from the Zoom drinking party, May 15, 2020. Cited in ISR. (25 pages).

Office Action dated Jul. 7, 2022, issued in counterpart JP application No. 2020-187756, with English translation. (10 pages).

* cited by examiner

INFORMATION PROCESSING SYSTEM, INFORMATION PROCESSING APPARATUS, AND PROGRAM

TECHNICAL FIELD

The present invention relates to information processing systems, information processing apparatuses, and programs.

BACKGROUND ART

With the recent social circumstances, so-called remote work is becoming widespread. Heretofore, there have been techniques that enables to provide an environment in which voices and images can be shared among participants via a network, such as a so-called Web conference system (refer for example to Patent Document 1).

CITATION LIST

Patent Document

[PTL 1] Japanese Patent Application Laid-Open Publication No. 2019-176386

SUMMARY OF INVENTION

Technical Problem

However, according to the prior art techniques including that disclosed in Patent Document 1 mentioned above, presence of the participants of the Web conference were only determined based on information entered through microphones and cameras built into or connected to devices used by the respective participants. In other words, the presence of participants could be confirmed by other participants only through one-dimensional input/output information of voice or image.

Under such technical background, it is difficult for users of the so-called remote work system to realize communication of a level of communication realized by workers in a real-world office.

In consideration of the above-mentioned circumstances, the present invention aims at providing a technique related to a communication that is more convenience and simple.

Solution to Problem

In order to achieve the objects mentioned above, an information processing system according to one aspect of the present invention includes
a first apparatus configured to be used for entering an information that a first user wishes to transmit;
a second apparatus configured to be used to receive the information by a second user; and
a server,
wherein the first apparatus includes
an input information reception unit configured to receive the information being entered as an input information,
wherein the second apparatus includes
a second input information acquisition unit configured to acquire the input information, and
an output information generation unit configured to generate an output information to be output to the second user based on the input information, and
wherein the server includes
an object position specification unit configured to specify a position of an object corresponding to the first user and the second user within a virtual space,
a first input information acquisition unit configured to acquire the input information,
a distance information acquisition unit configured to acquire a distance information related to a distance between the first user and the second user based on a position of each of the objects specified by the object position specification unit, and
a condition determination unit configured to determine a condition for generating an output information to be output to each of the second users based on the distance information and the input information.

Advantageous Effects of Invention

The present invention enables to provide a technique related to communication that is more convenient and simple.

DESCRIPTION OF EMBODIMENTS

Now, an embodiment of the present invention will be described with reference to the drawings.

First, a configuration of an information processing system according to one embodiment of the present invention will be described with reference to FIG. 1.

Figure 1:
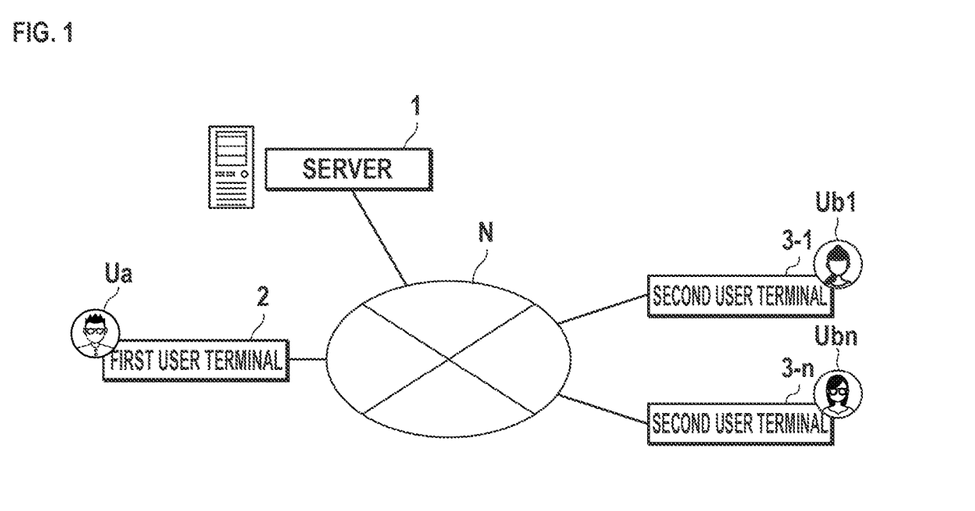
FIG. 1 is a block diagram illustrating an example of a configuration of an information processing system according to one embodiment of the present invention.

FIG. 1 is a block diagram illustrating an example of a configuration of the information processing system according to one embodiment of the present invention.

An information processing system illustrated in FIG. 1 (hereinafter referred to as a "present system") includes a server 1, a first user terminal 2, and second user terminals 3-1 through 3-n (n being an arbitrary integer value of 1 or greater).

The server 1, the first user terminal 2, and the second user terminals 3-1 through 3-n are mutually connected via a network N such as the Internet. The form of network N is not specifically limited, and for example, a Bluetooth (Registered Trademark), a Wi-Fi, a LAN (Local Area Network), or the Internet and the like can be adopted.

The server 1 is an information processing apparatus managed by a service provider G. The server 1 executes various processes for realizing the present service described later while communicating as required with the first user terminal 2 and the second user terminals 3-1 through 3-n.

The first user terminal 2 is an information processing apparatus that is operated by a first user Ua wishing to transmit a predetermined information. The first user terminal 2 is composed, for example, of a personal computer, a smartphone, or a tablet and so on.

The second user terminals 3-1 through 3-n are respectively an information processing apparatus operated by each of second users Ub1 through Ubn who can receive the predetermined information sent from the first user terminal 2 The second user terminals 3-1 through 3-n are each composed, for example, of a personal computer, a smartphone, or a tablet and so on.

Hereafter, when it is not necessary to distinguish the respective second user terminals 3-1 through 3-n, they are collectively referred to as a "second user terminal 3". When it is not necessary to distinguish the respective second users Ub1 through Ubn, they are collectively referred to as a "second user U13".

Figure 2:
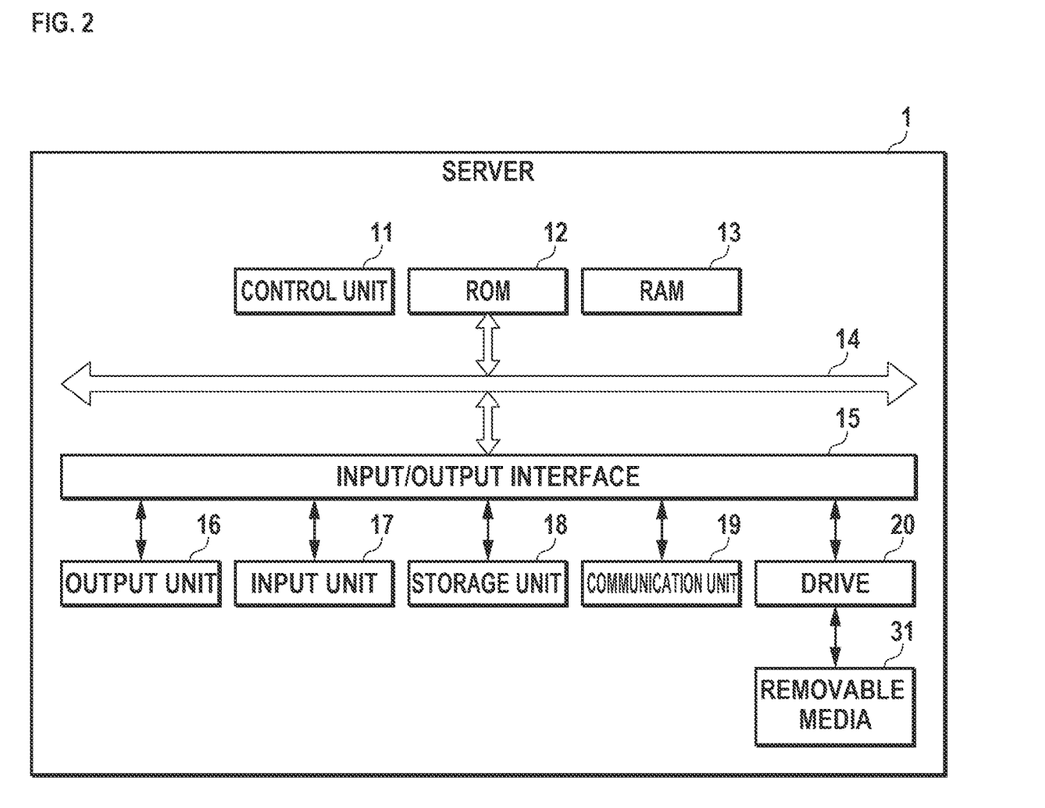
FIG. 2 illustrates an example of a hardware configuration of a server of the information processing system according to FIG. 1.

FIG. 2 is a block diagram illustrating one example of a hardware configuration of a server in the information processing system according to FIG. 1.

The server 1 includes a control unit 11, a ROM (Read Only Memory) 12, a RAM (Random Access Memory) 13, a bus 14, an input/output interface 15, an output unit 16, an input unit 17, a storage unit 18, a communication unit 19, and a drive 20.

The control unit 11 is composed, for example, of a microcomputer including a CPU, a GPU, and a semiconductor memory, and executes various processes according to programs stored in the ROM 12, or programs loaded to the RAM 13 from the storage unit 18.

The RAM 13 also stores necessary data, etc. for executing the various processes by the control unit 11 as required.

The control unit 11, the ROM 12, and the RAM 13 are mutually connected via the bus 14. The input/output interface 15 is also connected to the bus 14. The output unit 16, the input unit 17, the storage unit 18, the communication unit 19, and the drive 20 are connected to the input/output interface 15.

The output unit 16 is composed of a display, a speaker and so on, and outputs various information as image and audio.

The input unit 17 is composed of a keyboard, a mouse and so on, and various information are entered therethrough.

The storage unit 18 is composed of a hard disk, a DRAM (Dynamic Random Access Memory) and so on, and stores various data.

The communication unit 19 performs communication with another apparatus (for example, the first user terminal 2 or the second user terminal 3 of FIG. 1) via the network N including the Internet.

The drive 20 is provided as needed. A removable media 31 such as a magnetic disk, an optical disk, a magneto-optical disk, or a semiconductor memory is mounted to the drive 20 as required. The program read from the removable media 31 by the drive 20 is installed as needed to the storage unit 18. Further, the removable media 31 can store various data stored in the storage unit 18 in a similar manner as the storage unit 18.

Although not shown, the first user terminal 2 and the second user terminal 3 of FIG. 1 can be configured basically similarly as the hardware configuration of the server 1 illustrated in FIG. 2, so that the descriptions thereof are omitted.

Execution of various processes by the present system is enabled by cooperation of various hardware and various software constituting the present system, including the server 1 illustrated in FIG. 2.

Next, with reference to FIG. 3, an outline of a service that serves as the application target of the present system (hereinafter referred to as a "present service") will be briefly described.

Figure 3:
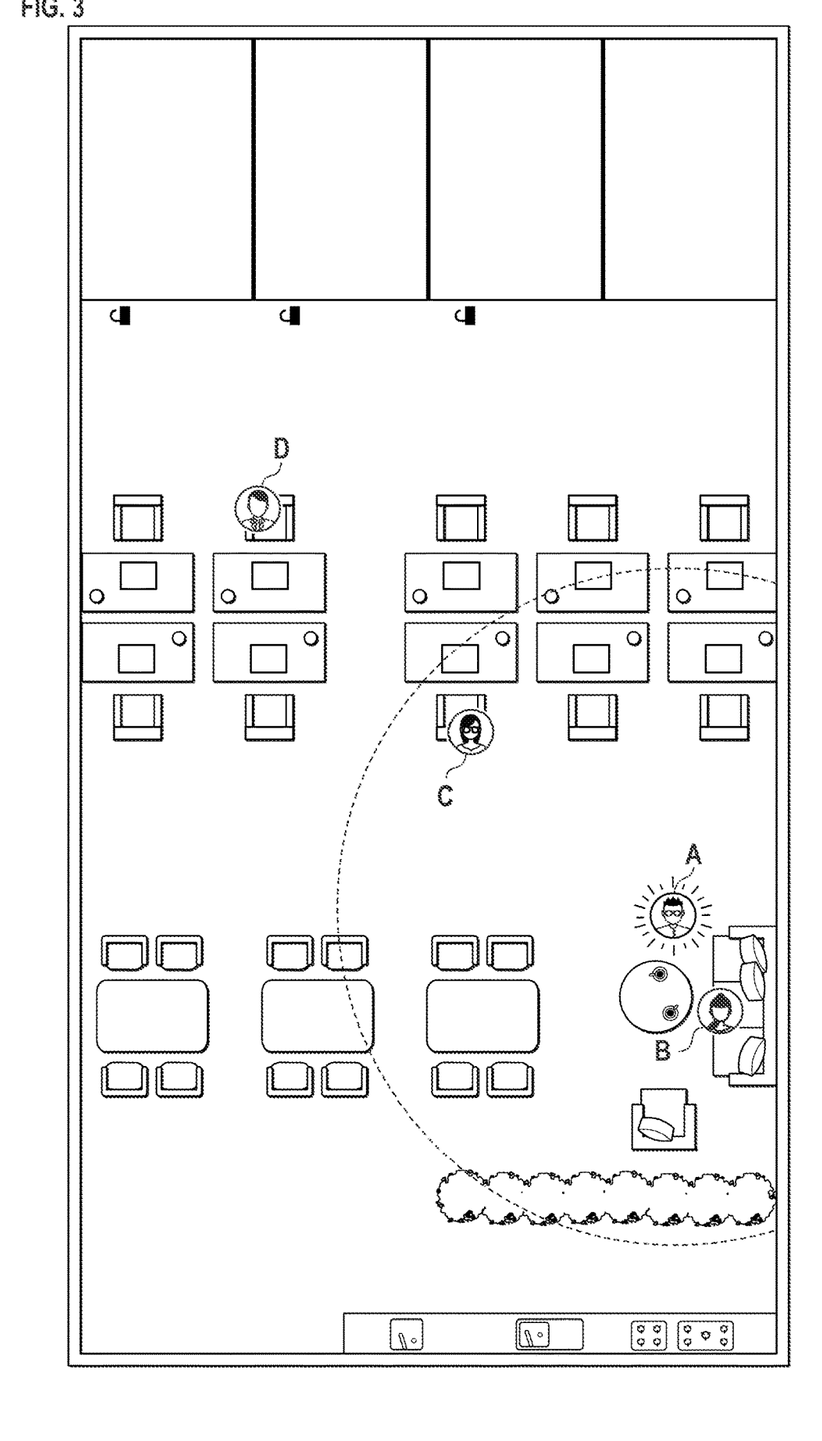
FIG. 3 illustrates an outline of a service which is a target of application of the information processing system according to FIG. 1.

FIG. 3 is a view illustrating an outline of the present service that can be realized according to the present system.

The present service is a communication support service provided by a service provider G to the first user Ua and the second user Ub. Specifically, for example, the present service is a communication support service that realizes communication similar to that performed in a real world using a virtual space.

That is, the present service is used by the first user Ua who wishes to transmit voice and the second user Ub who receives that voice realizing communication using a virtual space as if it was performed in the real world. Hereafter, if it is not necessary to specifically distinguish the first user Ua and the second user Ub, they are sometimes collectively referred to as the "user U".

The first user Ua and the second user Ub can receive the present service by operating a dedicated application software (hereinafter referred to as a "dedicated application") installed respectively to the first user terminal 2 and the second user terminal 3 or by accessing a dedicated website (hereinafter referred to as a "dedicated site") displayed on the first user terminal 2 and the second user terminal 3 using respective browser functions.

In the following, the description stating that "the first user Ua operates the first user terminal 2" means that the first user Ua uses the present service through the dedicated application or the dedicated site. Further, similarly, "the second user Ub operates the second user terminal 3" means that the second user Ub uses the present service through the dedicated application or the dedicated site.

FIG. 3 illustrates an example of an image displayed on a display unit not shown of each of the first user terminal 2 and the second user terminal 3

In the example illustrated in FIG. 3, a virtual space resembling a general office space of the real world (hereinafter referred to as an "office space S") is displayed. Therefore, similar to an office space in the real world, office desks, office chairs, a lounge suite (sofas, table, and cups of coffee), foliage plants, office kitchenette and so on are displayed by icons in the office space S illustrated in FIG. 3. Further, lockable conference rooms (three rooms) and a non-lockable conference room (one room) are displayed.

Further, an icon A indicating the first user Ua and icons B through D respectively indicating second users Ub1 through Ub3 are displayed in the office space S. Icons A and B are displayed in a vicinity of the lounge suite. Icons C and D are displayed on respective office chairs.

Each first user Ua can enter various information that he/she wishes to transmit by operating their own user terminal 2 Specifically, for example, the various information can be voice, text, or video and so on. In the description of the present embodiment, it is assumed that a voice of the first user Ua has been entered.

Further according to the present service, the information entered by the first user Ua is subjected to correction according to the distance between the icon of the first user Ua and the icon of the second user Ub in the virtual space, before being output from the second user terminal 3

That is, for example, voice is output in a volume (decibel) not so different from the volume of the entered voice to the second user Ub who is positioned at a close distance from the first user Ua within the office space S. In contrast, a voice in a low volume is output to the second user Ub positioned at a far distance from the first user Ua within the office space S. If the distance between the first user Ua and the second user Ub is farther than a certain distance, for example, the voice will not be output from the second user terminal 3

If the entered information is a text or a video, for example, it may be possible to have a correction based on "transparency" according to the distance within the office space S.

As illustrated in the example of FIG. 3, icons A and B are arranged at mutually close positions, whereas icons A and C are arranged at relatively distant positions. Icons A and D are arranged at even more distant positions.

As mentioned above, according to the present service, the volume of the voice of the sender being output differs according to the distance from the sender of the voice. That is, on the second user terminal 3 corresponding to icon "C", a voice smaller than the voice output from the second user terminal 3 corresponding to icon "B" is output.

Further, the dotted line in FIG. 3 illustrates an audile range corresponding to the voice output by the first user Ua. Icon D exists outside the audible range of the voice of the first user Ua. Therefore, the voice of the first user Ua will not be output from the second user terminal 3 corresponding to icon D.

In the example of FIG. 3, the display of icon A is highlighted by lighting or pattern, unlike the other icons B through D. This indicates that the first user Ua corresponding to icon A is outputting the voice (talking). Therefore, each of the second users Ub can recognize who is outputting the voice (talking) just by looking at the icons displayed on the screen.

Further, the first user Ua and each of the second users Ub can move the icon corresponding to him/herself freely within the office space S. The method for moving the icons is not limited, and for example, the icon can be moved by dragging.

Therefore, for example, the second user Ub can have a conversation with the first user Ua who he/she wishes to have a conversation with by arranging his/her icon close to the first user Ua. Meanwhile, for example, if the second user Ub wishes to concentrate on his/her job, it may be possible to provide a setting so that the voice of the first user Ua will not be output by intentionally arranging his/her icon at a far distance (out of the audible range) from the first user Ua.

Specifically, according to the illustrated example of FIG. 3, the first user Ua corresponding to icon A and the second user Ub1 corresponding to icon B can communicate with each other in such a manner as if they were sitting on a sofa existing in the real world and talking over a cup of coffee.

Similarly, the second user Ub2 corresponding to icon C and the second user Ub3 corresponding to icon D can concentrate on their work as if they are sitting at their desks in the real-world office. Further, they can chat with each other as needed.

That is, by arranging the icon corresponding to him/herself at an arbitrary location within the virtual space, each of the first user Ua and the second users Ub can realize various types of communications according to the position (positional relationship) of their icons within the virtual space, similar to the communication performed in the real world.

Figure 4:
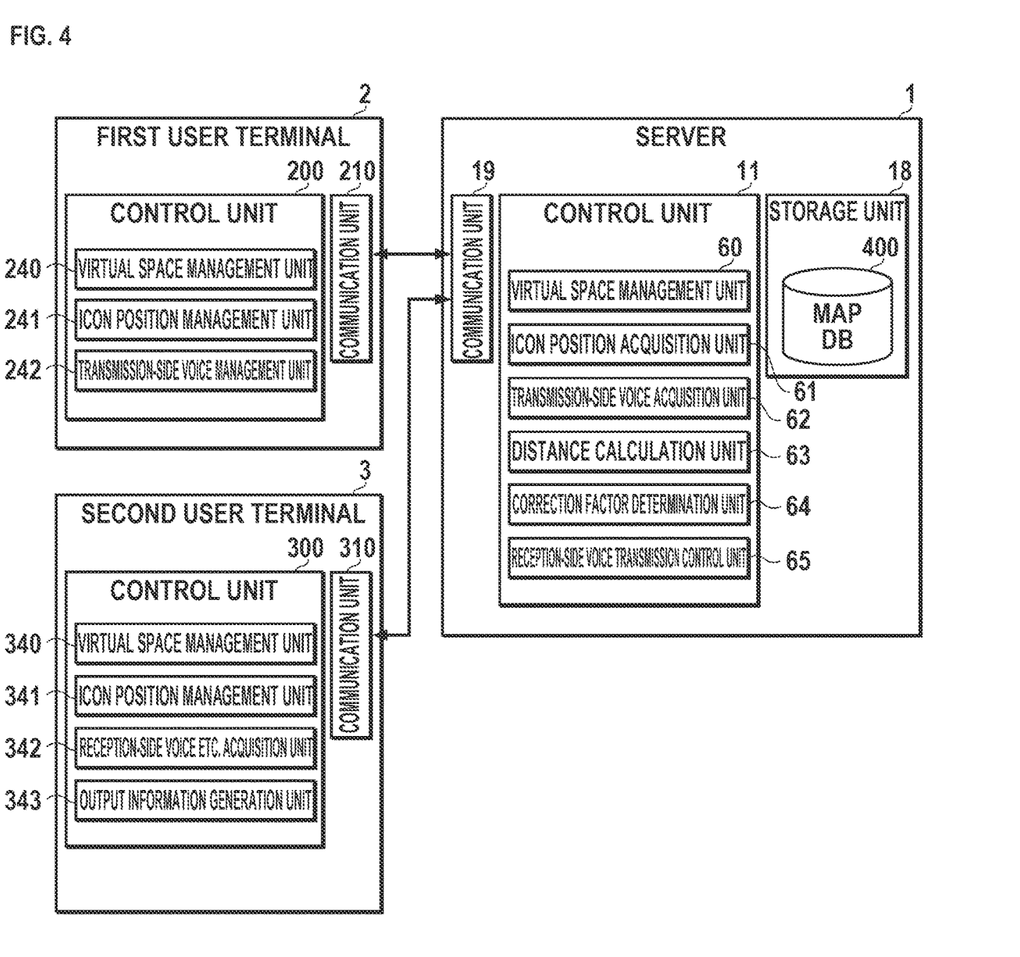
FIG. 4 is a functional block diagram illustrating an example of a functional configuration for executing a voice transmission processing among the functional configurations of a server of FIG. 2, and a first user terminal and a second user terminal of FIG. 1.

FIG. 4 is a functional block diagram illustrating one example of a functional configuration for executing a voice transmission processing among the functional configurations of the server 1 according to FIG. 2 and the first and second user terminals 2 and 3 according to FIG. 1.

First, one example of the functional configuration according to the server 1 will be described.

As illustrated in FIG. 4, by executing various programs, the control unit 11 of the server 1 functions as a virtual space management unit 60, an icon position acquisition unit 61, a transmission-side voice acquisition unit 62, a distance calculation unit 63, a correction factor determination unit 64, and a reception-side voice transmission control unit 65.

Further, a map DB 400 is provided in one area of the storage unit 18 of the server 1. Images of office spaces S serving as a candidate of various virtual spaces are stored in the map DB 400.

The virtual space management unit 60 of the server 1 generates a virtual space that can be provided to each of the first user Ua and the second users Ub based on the image stored in the map DB 400, for example, and manages the information.

That is, the virtual space management unit 60 generates a virtual space that can be provided to the first user Ua and each of the second usersn based on the image stored in the map DB 400, and transmits information related to the generated virtual space (hereinafter referred to as a "virtual space information") to each of the first user terminal 2 and the second user terminals 3.

The virtual space information sent to the first user terminal 2 and each of the second user terminals 3 is acquired by the first user terminal 2 and each of the second user terminals 3 and presented via a display unit not shown to the first user Ua and each of the second users Ub.

Then, the first user Ua and each of the second users Ub presented with the virtual space information can arrange the icon corresponding to him/herself to an arbitrary position within the virtual space according for example to circumstances or one's object within the virtual space. Position information of the respective icons arranged in this manner in the virtual space (hereinafter referred to as an "icon position information") is acquired by the first user terminal 2 and each of the second user terminals 3 and sent from the first user terminal 2 and each of the second user terminals 3 to the server 1.

The icon position acquisition unit 61 acquires the icon position information of each of the first user Ua and the second users Ub sent from the first user terminal 2 and each of the second user terminals 3 via the communication unit 19.

That is, the icon position acquisition unit 61 specifies the positions of objects corresponding to the first user Ua and each of the second users Ub within the virtual space.

Further, the first user terminal 2 acquires information related to the voice that the first user Ua wishes to transmit to each of the second users Ub (hereinafter referred to as a "transmission-side voice information"), and the transmission-side voice information is sent from the first user terminal 2 to the server 1.

The transmission-side voice acquisition unit 62 acquires the transmission-side voice information transmitted from the first user terminal 2 via the communication unit 19.

That is, the transmission-side voice acquisition unit 62 acquires input information related to the first user Ua.

The distance calculation unit 63 calculates the distance between respective icons based on the positions of the respective icons within the virtual space corresponding to the first user and each of the second users acquired by the icon position acquisition unit 61.

That is, the distance calculation unit 63 acquires distance information related to the distance between the first user Ua and the second users Ub within the virtual space based on the positions within the virtual space of each of the objects specified by an object position specification unit.

The correction factor determination unit 64 determines conditions of correction (hereinafter referred to as a "correction factor") of output information regarding the transmission-side voice information based on the distance between respective icons calculated by the distance calculation unit 63.

That is, the correction factor determination unit 64 determines the conditions for generating the output information output to each of the second users based on the distance information and the input information.

In the description, correction refers to a correction for attenuating the transmission-side voice information. As mentioned earlier, according to the present system, the transmission-side voice information entered by the first user Ua is subjected to correction according to distance between the first user Ua and the second users Ub within the virtual space before being output from each of the second user terminals 3. In other words, the correction factor typically refers to an attenuation factor regarding the voice information being entered.

Further, the method for determining the correction factor should be determined by taking into consideration the distance between respective icons within the virtual space, and it is not specifically limited. The server 1 can adopt arbitrary methods and references in addition to the positions of the respective icons and the concept of the audible range. The actual methods and references that can be adopted will be described later with reference to FIGS. 5 and 6, for example.

The reception-side voice transmission control unit 65 transmits the transmission-side voice information acquired by the transmission-side voice acquisition unit 62 and the correction factor determined by the correction factor determination unit 64 to each of the second user terminals 3.

Next, an example of a functional configuration of the first user terminal 2 will be described.

As illustrated in FIG. 4, a control unit 200 of the first user terminal 2 functions as a virtual space management unit 240, an icon position management unit 241, and a transmission-side voice management unit 242 by executing various programs and the like.

The virtual space management unit 240 acquires the virtual space information transmitted from the server 1 via a communication unit 210. The virtual space management unit 240 presents the acquired virtual space information to the first user Ua.

The icon position management unit 241 acquires the icon position information of the icon corresponding to the first user Ua (for example, icon A) based on the operation of the first user Ua to which the virtual space information has been presented. Further, the icon position management unit 241 transmits the acquired icon position information of icon A to the server 1.

The transmission-side voice management unit 242 acquires the transmission-side voice information related to the voice that the first user Ua wishes to transmit. The transmission-side voice management unit 242 transmits the acquired transmission-side voice information to the server 1.

Next, an example of a functional configuration of the second user terminal 3 will be described.

As illustrated in FIG. 4, a control unit 300 of the second user terminal 3 functions as a virtual space management unit 340, an icon position management unit 341, a reception-side voice etc. acquisition unit 342, and an output information generation unit 343 by executing various programs and the like.

The virtual space management unit 340 acquires the virtual space information transmitted from the server 1 via a communication unit 310. The virtual space management unit 340 presents the acquired virtual space information to each of the second users Ub.

The icon position management unit 341 acquires icon position information of icons (such as icons B through D) corresponding to each of the second users Ub based on the operations of each of the second user Ub to which the virtual space information has been presented. Further, the icon position management unit 341 transmits the icon position information of each of the icons (such as icons B through D) being acquired to the server 1.

The reception-side voice etc. acquisition unit 342 acquires the transmission-side voice information and the correction factor transmitted from the server 1 via the communication unit 310.

The output information generation unit 343 generates output information output to each of the second users Ub based on the transmission-side voice information and the correction factor acquired by the reception-side voice etc. acquisition unit 342.

Next, with reference to FIG. 5, a concept of an obstacle that can be provided as a function of the present service will be described.

Figure 5:
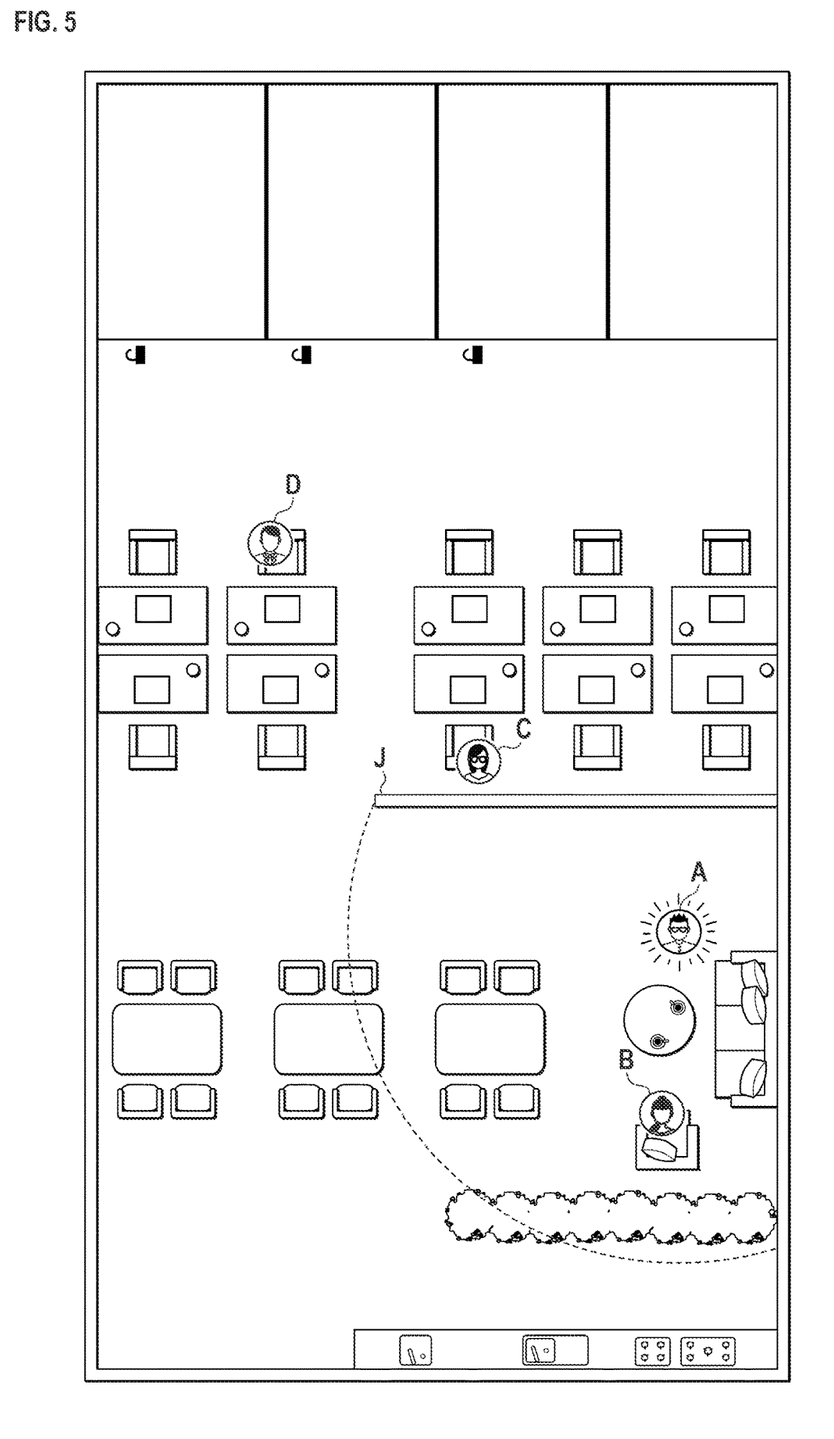
FIG. 5 illustrates an example of an image displayed on the first user terminal and the second user terminal according to FIG. 4.

FIG. 5 illustrates one example of an image displayed on the first user terminal and the second user terminal of FIG. 4.

In the example of FIG. 5, an obstacle object J is arranged between the icon A corresponding to the first user Ua and icons C and D corresponding to each of the second users Ub2 and Ub3.

The obstacle object J is an object that resembles an obstacle existing in the real world, such as a wall. In the present service, the correction factor can be determined by taking the presence of such an obstacle into consideration, for example.

Specifically, for example, the value of the "correction factor" can be calculated using a following formula; "correction factor"="obstacle distance"/"audible range"×"transmittance"×("target distance"−"obstacle distance")/("audible range"−"obstacle distance").

In the example of FIG. 5, an example is illustrated where a cement wall (with 0% transmittance) is arranged. Further, a material of the wall can to be set. For example, a wall made of frosted glass (with 70% transmittance, for example), such as a partition, can be arranged. Thereby, the office space S in the virtual space can be utilized as if it was the office space in the real world.

Next, with reference to FIG. 6, a concept of a conference room that can be provided as a function of the present service will be described.

Figure 6:
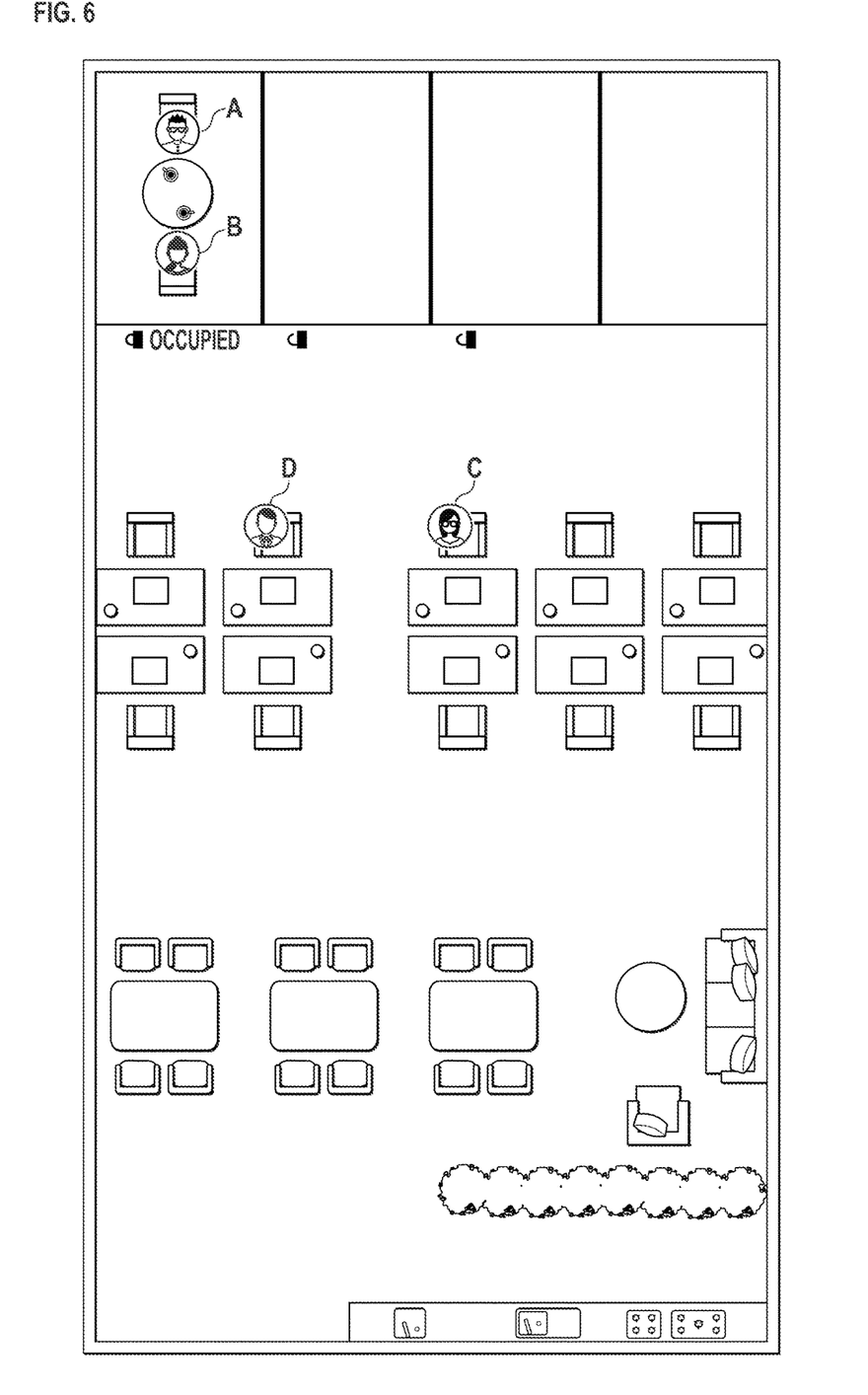
FIG. 6 illustrates an example of an image displayed on the first user terminal and the second user terminal according to FIG. 4, which differs from the example illustrated in FIG. 5.

FIG. 6 is an example of an image displayed on the first user terminal and the second user terminals of FIG. 4, which illustrates an example that differs from the example of FIG. 5.

In the example of FIG. 6, lockable conference rooms (three rooms) and a non-lockable conference room (one room) are arranged. These conference rooms can be used just like the conference rooms in the real world by having the icons A through D respectively move and enter the rooms. Video conferences, projection of projectors and so on can be performed in the conference room. Among these rooms, the lockable conference rooms (three rooms) can be locked so that only limited members can enter and attend the conference. Further, the non-lockable conference room (one room) can be used as a free space that anyone can enter.

Figure 7:
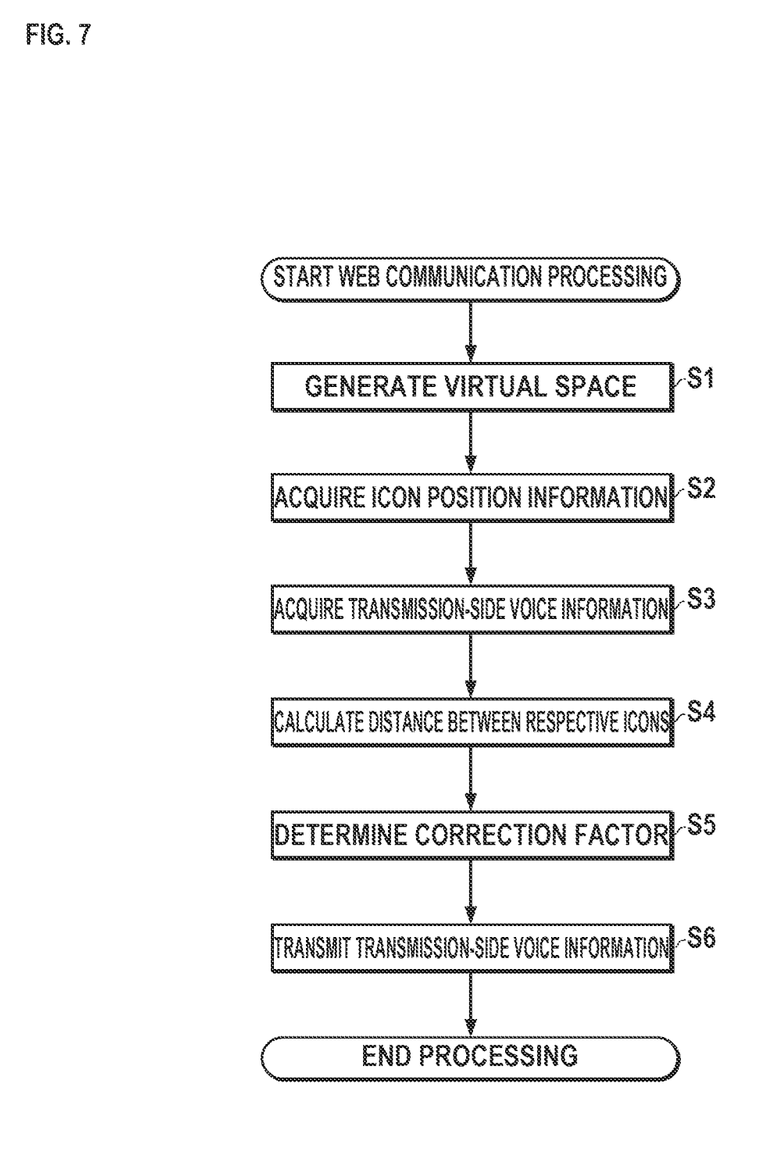
FIG. 7 is a flowchart illustrating an example of flow of the voice transmission processing among the processes performed in a server having the functional configuration illustrated in FIG. 4.

FIG. 7 is a flowchart illustrating one example of a flow of voice transmission processing among the processes of the server having the functional configuration of FIG. 4.

In step S1, the virtual space management unit 60 of the server 1 generates a virtual space that can be presented to the first user Ua and each of the second users Ub based on images and the like stored in the map DB 400 and manages the information.

That is, the virtual space management unit 60 generates the virtual space that can be presented to the first user Ua and each of the second users Ub based on images and the like stored in the map DB 400 and presents the generated virtual space information to the first user Ua and each of the second users Ub.

In step S2, the icon position acquisition unit 61 acquires the icon position information of the first user Ua and each of the second users Ub transmitted from the first user terminal 2 and each of the second user terminals 3 via the communication unit 19.

That is, the icon position acquisition unit 61 specifies the position of the objects within the virtual space corresponding to the first user Ua and each of the second users Ub.

In step S3, the transmission-side voice acquisition unit 62 acquires the transmission-side voice information transmitted from the first user terminal 2 via the communication unit 19.

In step S4, the distance calculation unit 63 calculates the distances between the respective icons based on the positions within the virtual space of the icons corresponding to the first user Ua and each of the second users Ub acquired in step S2.

In step S5, the correction factor determination unit 64 determines the correction factors based on the distances between the respective icons calculated in step S4.

In step S6, the reception-side voice transmission control unit 65 transmits the transmission-side voice information acquired in step S3 and the correction factor determined in step S5 to each of the second user terminals 3.

An embodiment according to the present invention has been described, but the present invention is not limited to the above-mentioned embodiment, and various modifications and improvements within the scope of the object of the present invention are included in the present invention.

Now, a concept of a visual field (direction) that can be additionally provided as a function of the present service will be described with reference to FIG. 8.

Figure 8:
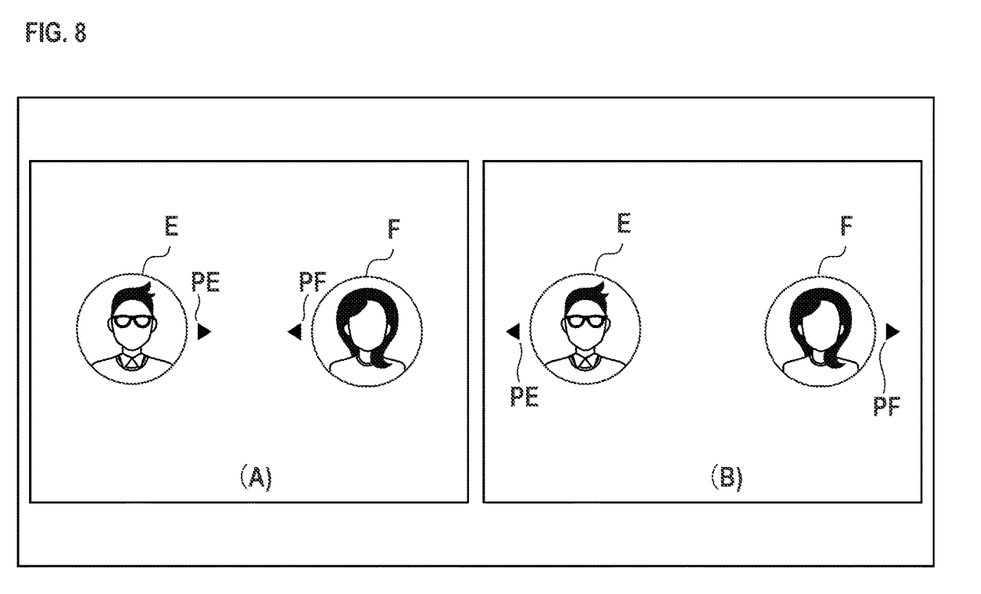
FIG. 8 illustrates an example of an image displayed on the first user terminal and the second user terminal according to FIG. 4, which differs from the examples illustrated in FIGS. 5 and 6.

FIG. 8 is a view illustrating an example of an image displayed on the first user terminal and the second user terminal of FIG. 4, which is an example that differs from the examples of FIGS. 5 and 6.

According to FIG. 8 (A), icons E and F corresponding to each of the second users Ub are displayed, and icons PE and PF are displayed in the vicinity of the respective icons.

The icons PE and PF indicate a "visual field (direction)" of each of the objects of the icons E and F. In the example of FIG. 8 (A), icon E is directed toward icon F, and icon F is directed toward icon E. That is, the circumstance illustrated in FIG. 8 (A) may be recognized as a circumstance in which the two users are paying attention to each other and talking with each other face to face, so to say, in the real world.

In such a case, for example, a loud voice is output from each of the first user terminal 2 and the second user terminal 3 corresponding to icons E and F, compared to a case where there is no display of the visual field (direction). The same applies to the input side terminal. That is, the input side can also hear better from the direction in which he/she is facing in response to the visual field.

Meanwhile, in the example of FIG. 8 (B), the icons PE and PF are facing opposite directions. The icon PE is directed from icon E toward a direction opposite to the direction of icon F, and the icon PF is directed from icon F toward a direction opposite to the direction of icon E.

In this case, for example, a smaller voice is output from each of the first user terminal 2 and the second user terminal 3 corresponding to icons E and F, compared to a case where the visual field (direction) is not displayed.

In conclusion, the concept of a "visual field (direction)" that is applicable to the present service is the concept related to the direction of the object. For example, a louder voice is output from the second user terminal 3 that exists at the direction of the icon of the first user Ua. Meanwhile, a smaller voice is output from the second user terminal 3 that corresponds to the object displayed at a position that differs from the direction toward which the object is directed. Thereby, the first user Ua and the second users Ub can realize communication that reflects the rules of the real world.

Further, a concept of a static object that can be provided as a function of the present service will be described with reference to FIG. 9.

Figure 9:
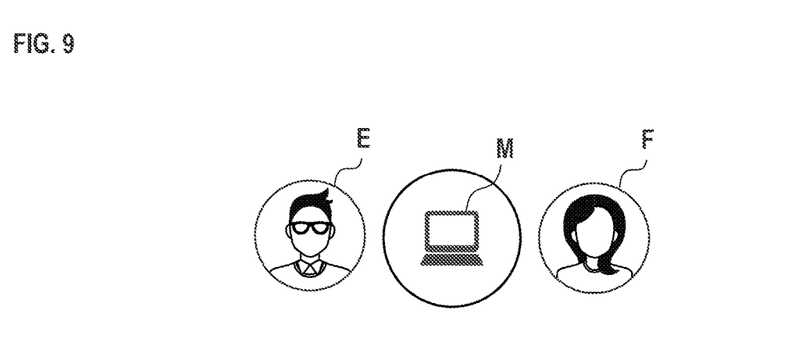
FIG. 9 illustrates an example of an image displayed on the first user terminal and the second user terminal according to FIG. 4, which differs from the examples illustrated in FIGS. 5, 6 and 8.

FIG. 9 is an example of an image displayed on the first user terminal and the second user terminal of FIG. 4, and it illustrates an example that differs from the examples of FIGS. 5, 6, and 8.

Though it was not described in the above-mentioned embodiment, the server 1 can adopt an object that can be used in common by the first user Ua and the second user Ub (hereinafter referred to as a "common object") and allow the object to be arranged at an arbitrary location within the virtual space.

Specifically, for example, in the example of FIG. 9, icons E and F and icon M are displayed. The icon M is a common object related to playing video, and for example, when each of the first user Ua and the second user Ub clicks on the icon M, a predetermined video is played on each of the first user terminal 2 and the second user terminal 3. For example, icon M is fixed and displayed on the same location within the virtual space from the point of time at which the present service is provided.

According to the present service, as described, the concept of a common object that can be used in common arbitrary by the first user Ua and the second users Ub is adopted, so that predetermined contents can be used in common freely among the plurality of users U. Thereby, the first user Ua and each of the second users Ub participating can realize a communication that is even more similar to the communication performed in the real world.

The common object is not limited to that related to playing videos. For example, any type of common object can be adopted according to the present service, such as participation to various games (such as Japanese chess, Othello (registered trademark) (reversi), and werewolf games), sharing of videos (such as camera images or PC images), and displaying of advertisement.

The common object can include a static object that is fixed at the same location within the virtual space and a dynamic object that can be moved to arbitrary locations. For example, the static object can be a television or a projector that is fixed within the virtual space, and the dynamic object can be a laptop of each user.

Further advantages of the present service according to the embodiment described above will be described briefly.

As mentioned earlier, one of the advantages of the present service is that the user U working remotely can communicate with others in an environment that enables the user to communicate as if he/she were working in an office in the real world.

However, the advantages of the present service are not limited thereto. For example, one of the advantages of the present service is that when a large number of users U join a Web conference, the positional relationships of the large number of users and the range of the users U who can listen to the contents of the conversation are set clearly so that they can be recognized intuitively. According to conventional Web conference services and so on, a function that enables the sender of the voice to not allow the receiver to hear the voice (so-called a mute function) is implemented, but the function merely allows each user U to determine the setting individually, and it was inconvenient. In contrast, the present service enables clear and collective management of detailed needs in a Web conference and the like, such as which of the large number of users U is/are allowed to listen to a conversation and which are not allowed to listen (or to realize a setting that makes it more difficult to listen).

Further, with the recent spread of remote work, a circumstance in which a Web conference is continued for a couple of hours may be assumed. In such an environment, to be able to merely hear a voice or not is not so important. That is, there is a need for maintaining an environment where conversations of others can be heard (rather, it is not preferable to completely shut out the conversations of others), but the volume thereof is suppressed to a level that does not interfere with the work that he/she is doing so that he/she can concentrate on their work. The present service is useful as a tool for answering to a wide variety of needs related to the Web conference and the like including the needs mentioned above.

Further, one of the directivities that the present service seeks is a construction of a space (dimension) online. That is, for example, a conventional Web conference is merely single dimensional (on/off of data input and output), whereas the present service further includes a two-dimensional concept of movement. Further, the present service may even include the concept of three or more dimensions where neighboring people can interact with one another through plug-ins and the like. In other words, the information processing system according to the present service is an information processing system that enables to realize two-dimensional communication by adopting the concept of space.

Further, a concept of a streaming socket that can be adopted according to the present service will be described.

For example, in a case where the icon is not present within the audible range of the sender, such as in the case of the icon C according to the present embodiment (especially FIG. 3), the voice of the sender cannot be heard.

That is, according to the result of calculation of distance between icons by a distance calculation socket, if an icon indicating the second user Ub deviates from the area in which the voice whose source is the icon denoting the first user Ua reaches (hereinafter referred to as an "audible range"), the streaming socket of the second user Ub corresponding to the icon having deviated from the audible range is cutoff. As a result, the second user Ub corresponding to the icon having deviated from the audible range of the icon denoting the first user Ua will not be able to hear the voice whose source is the icon denoting the first user Ua.

In contrast, according to the result of calculation of the distance between icons by the distance calculation socket, if the icon denoting the second user Ub is not deviated from the audible range of the icon denoting the first user Ua, the streaming socket of the second user Ub is constructed. If the icon denoting the second user Ub moves from out of the audible range into the audible range of the icon denoting the first user Ua, the streaming socket is constructed.

In a case where a streaming socket is constructed, a correction is performed to attenuate the voice whose source is the icon denoting the first user Ua according to the distance between the icon denoting the first user Ua and the ion denoting the second user Ub.

Further, a concept of a communication method that can be adopted according to the present service will be described.

Recently, especially in distributing videos using a P2P (Peer to Peer) technique and the like, a method of relaying the received video and voice via a relay system is adopted with the aim of distributing videos efficiently at a low cost. This technique is described, for example, in Non-Patent Document 1. [Non-Patent Document 1] "Development of Video Distribution Platform on the Internet using P2P Technique—Answering to Needs of Image Distribution among Individuals and Communities—[Searched Oct. 30, 2020], on the Internet <https://www.ipa.go.jp/about/jigyo-seika/04fy-pro/chusho/2004-306d.pdf>

However, when such a relay system is adopted, a different delay time will occur according to the different orders of relay of the respective users. Therefore, for example, in a case where the users communicate with each other in real time including the above-mentioned services, communication will be performed while looking at different images.

In contrast, the present service can associate the concepts of such relay system mentioned above and "distance". That is, specifically, for example, the order of relay can be determined based on distance of each user from the object according to the present service. Now, based on the characteristics of the present service, users positioned close to each other are possibly engaged in real time conversation, so that even if the delay times caused by the relay system differ, the delay time of a group of users present at close distances is expected to be approximately the same level. Thereby, the users using the present service can realize an even more preferable communication.

Further, for example, the present service enables to apply a technique related to optimizing rendering according to the field of view of the user.

If a large number of users are present on a single screen in a communication service and the like that utilizes a large number of virtual spaces including the present service, if the movement of all the users are rendered, the memory and the like used by the users will be compressed significantly.

Therefore, according to the present service, a specification can be adopted where only the users that enter a predetermined range designated by the user are rendered. That is, the target of rendering is determined based on the communication information related to distance utilized in the present service, by which the use of the memory is optimized.

Further, for example, a specification can be adopted in which background, etc. is divided when it is being uploaded and the image within a predetermined range is prioritized during download, by which the time required for accessing can be compressed.

Further, the present service can perform operations based on a voice command. Specifically, for example, when the second user Ub talks to the second user terminal 3 to "mute voice", the voice is recognized via a command socket that functions as an API, and the action is executed. Since the present service is realized by correcting the digital data being output, such a voice command can be realized even in a case where the voice is in the mute state or the user U exists outside the audible range.

The present service can be used comfortably even in an offline environment by utilizing an AR (Augmented Reality) technique and the like.

Specifically, for example, the present service adopts a programmable voice apparatus such as a smart speaker, for example, as an access point. The access point functions as a point of contact that connects an offline environment and an online environment.

That is, in a state where a large number of users U participate in the Web conference in an online environment, there may be a case where a small number of users U participate in the Web conference in an offline environment. In such a case, the users U in the offline environment may not be able to adapt him/herself to the communication among users U in the online environment.

In such a case, for example, if a state is created in which the voice of the user U in the online environment can be heard from the access point reflecting the virtual position of the user U in the offline environment, the Web conference in which a large number of users U participate in the online environment can be performed while constantly being conscious of the presence of users U in the offline environment. As a result, a preferable communication can be expected regardless of the communication environment.

Similarly, for example, if two or more access points are arranged in the office space S, by applying a technique of voice recognition or distance measurement based on the information acquired at the access points, it becomes possible to automatically acquire the positions of users U in the offline environment within the office space S and to reflect the information (such as input of voices or arrangement of icons) automatically to the Web conference, etc. realized in the online environment.

Specifically, for example, digital data such as voice entered to the access point from the user U in the offline environment may be subjected to correction such as improvement of sound quality by an equalizer, emphasizing or attenuating a specific frequency band, and so on, using techniques of distance measurement (triangulation), echo correction, noise correction, howling suppression, and so on.

Further, for example, specification of a person who transmitted the voice is performed by voice recognition. Specifically, for example, if voice data of the sender of the voice is already registered in the present service, analysis of voice-print and the like and verification thereof are performed to specify which user U is the sender of the voice.

Further, for example, methods of installing a digital camera capable of taking a 360-degree image or a plurality of general-purpose cameras are assumed as a method for utilizing techniques such as the AR.

Specifically, for example, the present service can combine a method of image recognition with the image taken by the camera to thereby recognize the users present in the offline environment and arrange the icons corresponding to the respective users automatically on the online environment (such as in the office space 5).

Even further, in a case where the digital camera capable of taking a 360-degree image is installed in the conference room, for example, the accurate positional relationships of the respective users can be recognized easily and reflected on the positions of icons on the online environment (such as in the aforementioned conference room).

According further to the present service, in addition to the icons described in the above-mentioned embodiment, although not shown, icons indicating megaphones, microphones, doors and the like can be arranged at arbitrary positions. Among these, the megaphone is an icon that is used when there is a need to have the voice heard by all users U excluding the users U in the conference room. The microphone is an icon that is used when the user wishes to switch the mute function of his/her own voice on and off. Further, the door is an icon used when the user exists from the office space S and moves to a lobby (not shown).

Further according to one embodiment of the present system, the following services can be realized in addition to the services described above, for example.

That is, as described above, in the office space S, the voice of a user U close by can be heard clearly, but the voice of a distant user U is either not audible or barely audible, similar to the office space of the real world. This is because correction such as attenuation is added to the output digital data according to the distance between icons. Meanwhile, according to the present service, the volume of the voice being output can be adjusted forcibly according to the purpose of use. For example, the on and off of the mute function can be set individually for each terminal of the user U (the first user terminal 2 and the second user terminal 3).

Although not shown, an entrance of the office space S can be provided, and the user U inside the office space S can be summoned from the outside. Thereby, visitor correspondence can be performed in a similar manner as if it were performed in the office of the real world.

Although not shown, an icon having a video embedded therein be arranged at a predetermined position in the office space S. For example, icons resembling a monitor or a television can be arranged at a predetermined position in the office space S and a video can be embedded in those icons. Then, the appearance of the video or the sound of the voice (such as speaking voices and background music) output together with the video can be corrected in accordance with the distance from the icon to the icon denoting the user U or the presence or absence of an obstacle such as the wall existing along a straight line connecting the icons. Thereby, an office space even more similar to an office space of the real world can be realized.

Furthermore, according to the above-mentioned embodiment, a configuration is adopted in which the first user Ua operates the first user terminal 2 to transmit information (such as voice data) and the second users Ub receive information by operating the second user terminal 3. However, the first user Ua and the second users Ub are not fixed, and the user U utilizing the present service can be the first user Ua or the second user Ub depending on respective cases. That is, the user U utilizing the present service will be the first user Ua when transmitting voice and the like in the office space S and will be the second user Ub when receiving the voice and the like.

In other words, even the first user terminal 2 has the respective functions of the second user terminal 3 and can be used for receiving information, and in contrast, the second user terminal 3 can have the respective functions of the first user terminal 2 and can be used for transmitting information.

Further according to the present embodiment, for example, the office space S is adopted as the virtual space serving as the target of application of the present service, but the present disclosure is not limited thereto. Any type of virtual space can be adopted. Specifically, for example, various types of virtual spaces, such as an event site, a party room, a restaurant, or a matchmaking party site, can be adopted.

The details of a case in which an event site is adopted as the virtual space being the target of application according to the present service will be additionally explained. Generally, at an event site, a large number of users take arbitrary actions, so that a large variety of communications occur in real time. According to the present service, only an intuitively recognizable UI can reproduce in real time such various types of communications that may occur in real time in the real world.

Further, for example, in the above-mentioned embodiment, there is one room serving as the office space S, but it may be possible to arrange multiple office spaces mutually adjacently so that the users U can move from one room to another.

Further, for example, the system configuration illustrated in FIG. 1 and the hardware configuration of the server 1 illustrated in FIG. 2 are mere examples for achieving the objects of the present invention, and the present disclosure it not specially limited thereto.

Further, for example, the series of processes mentioned above can either be executed by hardware or executed by software.

Further, for example, the number of various hardware (the server 1, the first user terminal 2, and the second user terminal 3) constituting the present system and the users thereof can be arbitrary, and the configuration can include other hardware and the like. Furthermore, a single computer and so on can be adopted as the various hardware mentioned above.

Further, for example, when executing the series of processing by software, the program constituting the software is installed to the computer, etc. via the network or a recording medium.

The computer can be a computer assembled to a dedicated hardware.

The computer can further be a computer capable of executing various functions by installing various programs, such as a server, a general-purpose smartphone, or a personal computer.

That is, for example, a portable terminal such as an arbitrary computer or an arbitrary smartphone can be adopted freely as various hardware (the server 1, the first user terminal 2, and the second user terminal 3) according to the above-mentioned embodiment. Furthermore, arbitrary combinations can be adopted for the various types and contents of the various input units and various output units and so on.

Moreover, adopting a computer, etc. as the various hardware mentioned above is optional, and the present disclosure is not limited thereto.

Further, for example, the storage medium storing these programs is not only composed of a removable medium not shown that is provided separately from the apparatus body for providing programs to the user, but also composed of a storage medium, etc. provided to the user in a state installed in advance to the apparatus body.

In the present specification, the steps describing the program stored in the storage medium not only include processes that are performed in time series according to the illustrated order but also include processes that are performed in parallel or individually in a manner not necessarily performed in time series.

According further to the present specification, the term system refers to an entire apparatus that is composed of a plurality of apparatuses and plurality of units and so on.

In conclusion, the information processing system to which the present invention is applied can take the form of various types of embodiments having the following configuration.

That is, an information processing system to which the present invention is applied can include:

a first apparatus (for example, the first user terminal 2) configured to be used for entering an information that a first user wishes to transmit;

a second apparatus (for example, the second user terminal 3) configured to be used to receive the information by a second user; and a server (for example, the server 1), wherein the first apparatus includes an input information reception unit (for example, the transmission-side voice management unit 242) configured to receive the information being entered as an input information, wherein the second apparatus includes a second input information acquisition unit (for example, the reception-side voice etc. acquisition unit 342) configured to acquire the input information, and an output information generation unit (for example, the output information generation unit 343) configured to generate an output information to be output to the second user based on the input information, and wherein the server includes an object position specification unit (for example, the icon position acquisition unit 61) configured to specify a position of an object corresponding to the first user and the second user within a virtual space, a first input information acquisition unit (for example, the transmission-side voice acquisition unit 62) configured to acquire the input information, a distance information acquisition unit (for example, the distance calculation unit 63) configured to acquire a distance information related to a distance between the first user and the second user based on a position of each of the objects specified by the object position specification unit, and a condition determination unit (for example, the correction factor determination unit 64) configured to determine a condition for generating an output information to be output to each of the second users based on the distance information and the input information.

REFERENCE SIGNS LIST

1 Server
11 Control unit
60 Virtual space management unit
61 Icon position acquisition unit
62 Transmission-side voice acquisition unit 63 Distance calculation unit
64 Correction factor determination unit
65 Reception-side voice transmission control unit
400 Map DB
2 First user terminal
200 Control unit
240 Virtual space management unit
241 Icon position management unit
242 Transmission-side voice management unit
3 Second user terminal
300 Control unit
340 Virtual space management unit
341 Icon position management unit
342 Reception-side voice etc. acquisition unit
343 Output information generation unit
S Office space
Ua First user
Ub Second user

The invention claimed is:

1. An information processing system comprising:
a first apparatus configured to be used for entering an information that a first user wishes to transmit;
a second apparatus configured to be used to receive the information by a second user; and
a server,
wherein the first apparatus comprises
an input information reception unit configured to receive the information being entered as an input information,
wherein the second apparatus comprises
a second input information acquisition unit configured to acquire the input information, and
an output information generation unit configured to generate an output information to be output to the second user based on the input information, and
wherein the server comprises
an object position specification unit configured to specify a position of an object corresponding to the first user and the second user within a virtual space,
a first input information acquisition unit configured to acquire the input information,
a distance information acquisition unit configured to acquire a distance information related to a distance between the first user and the second user based on a position of each of the objects specified by the object position specification unit, and
a condition determination unit configured to determine a condition for generating an output information to be output to each of the second users based on the distance information and the input information,
wherein the output information is distributed to each of the second users by relaying the output information to each of the second users via a relay system, and
the server determines the order of relay of the output information based on the distance.

2. An information processing apparatus configured to be used for communication via a virtual space between a first user that wishes to transmit an information and a second user capable of receiving the information, the information processing apparatus comprising:
an object position specification unit configured to specify a position of an object corresponding to the first user and the second user within the virtual space,
an input information acquisition unit configured to acquire an input information related to the first user,
a distance information acquisition unit configured to acquire a distance information related to a distance between the first user and the second user based on a position of each of the objects specified by the object position specification unit, and
a condition determination unit configured to determine a condition for generating an output information to be output to each of the second users based on the distance information and the input information,
wherein the output information is distributed to each of the second users by relaying the output information to each of the second users via a relay system, and
the server determines the order of relay of the output information based on the distance.

3. The information processing apparatus according to claim 2,
wherein the condition determination unit comprises determining a condition for prohibiting output of the output information to the second user in a case where a distance between the first user and the second user is equal to or greater than a predetermined value.

4. The information processing apparatus according to claim 2,
wherein the condition determination unit is configured to determine the condition by further including a direction of the object.

5. The information processing apparatus according to claim 2,
wherein the object position specification unit is configured to specify a position of each of the objects based on information that can be acquired from an image being taken.

6. The information processing apparatus according to claim 2, further comprising
a communication method determination unit configured to determine an order of communication between the first user and the second user according to the distance information acquired by the distance information acquisition unit.

7. The information processing apparatus according to claim 2, further comprising
an image processing optimization unit configured to determine whether communication related to an image to be presented to the first user or the second user is possible or not according to a position of the object.

8. The information processing apparatus according to claim 2,
wherein the condition determination unit is configured to determine the condition by further including a presence or an absence of an other object in the virtual space, wherein the other object is an object related to an obstacle in the virtual space,
wherein the output information includes an audio, and the condition is calculated as a correction factor defined as:

the correction factor=obstacle distance/audible range×transmittance of the obstacle×(target distance−obstacle distance)/(audible range−obstacle distance).

9. The information processing apparatus according to claim 2, wherein the server determines the order of relay of the output information based on the distance such that a shorter distance is associated with a higher priority in the order of relay.

10. An information processing apparatus configured to be used for communication via a virtual space between a first user that wishes to transmit an information and a second user capable of receiving the information, the information processing apparatus comprising:

an object position specification unit configured to specify a position of an object corresponding to the first user and the second user within the virtual space, an input information acquisition unit configured to acquire an input information related to the first user, a distance information acquisition unit configured to acquire a distance information related to a distance between the first user and the second user based on a position of each of the objects specified by the object position specification unit, and a condition determination unit configured to determine a condition for generating an output information to be output to each of the second users based on the distance information and the input information, wherein the condition determination unit is configured to determine the condition by further including a presence or an absence of an other object in the virtual space, wherein the other object is an object related to an obstacle in the virtual space, wherein the output information includes an audio, and the condition is calculated as a correction factor defined as:

the correction factor=obstacle distance/audible range×transmittance of the obstacle×(target distance−obstacle distance)/(audible range−obstacle distance).

11. A non-transitory computer-readable medium storing a program configured to have a computer configured to be used for communication via a virtual space between a first user who wishes to transmit an information and a second user capable of receiving the information function as:

an object position specification step of specifying a position of an object corresponding to the first user and the second user within a virtual space, an input information acquisition step of acquiring an input information that has been entered by the first user who wishes to transmit the information, a distance information acquisition step of acquiring a distance information related to a distance between the first user and the second user based on a position of each of the objects specified by the object position specification step, a condition determination step of determining a condition for generating an output information to be output to each of the second users based on the distance information and the input information, wherein the output information is distributed to each of the second users by relaying the output information to each of the second users via a relay system, and an order determination step of determining the order of relay of the output information based on the distance.

* * * * *